June 22, 1937.    R. E. PARIS    2,084,450
MEANS FOR LINE JUSTIFICATION
Filed Sept. 28, 1934    4 Sheets-Sheet 3

INVENTOR

June 22, 1937.  R. E. PARIS  2,084,450
MEANS FOR LINE JUSTIFICATION
Filed Sept. 28, 1934  4 Sheets-Sheet 4
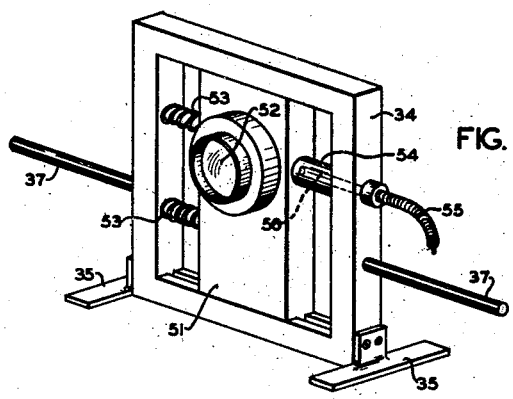
FIG. 4
FIG. 5
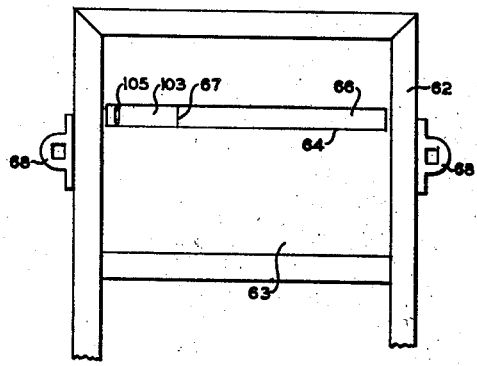
FIG. 6
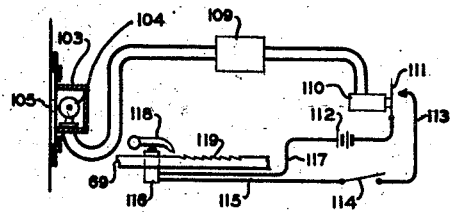
INVENTOR Patented June 22, 1937

2,084,450

UNITED STATES PATENT OFFICE 2,084,450

MEANS FOR LINE JUSTIFICATION

Robert E. Paris, New York, N. Y.

Application September 28, 1934, Serial No. 745,864

8 Claims. (Cl. 95—4.5)

This invention relates to means for effecting line justification, especially of typewritten material, and is in some particulars a continuation of my pending application Serial No. 741,798, filed August 28, 1934. In my said pending application I disclosed means for manually adjusting the copy and the lens-board of a camera, so as to photograph typewritten matter in justified form. The present invention contemplates a continuously running, fully automatic machine wherein the copy and the film, plate, or other light sensitive photographic material, shall be automatically fed as required; a cylindrical lens shall be adjusted automatically according to the length of line being photographed; the camera lens shall be automatically shifted to keep the left-hand margin in proper alignment in synchronism with the movement of the cylindrical lens; the camera shutter shall be automatically operated at the correct point in each cycle of the machine; and wherein the length of the line being photographed shall be automatically determined, and the necessary adjustments controlled.

It will, therefore, be seen that the principal object of the invention is to provide a fully automatic machine for effecting line justification from typewritten copy.

Another object is to utilize a light-sensitive cell for automatically supervising such justification.

Another object is to use an adjustable cylindrical lens for justification so as to permit of lengthwise stretch of the line without effecting any vertical distortion of the same.

Other objects will appear from the following description, and be specifically pointed out in the appended claims. All of these objects are attained by mechanism shown in the accompanying drawings, in which:

Fig. 4 is a detail perspective view of the camera lens-board.

Fig. 5 is a fragmentary detail view of the copy-holder and mask.

Fig. 6 is a detail of the light-sensitive control and the wiring diagram therefor.

Like characters of reference refer to like parts in the several views.

Figure 1:
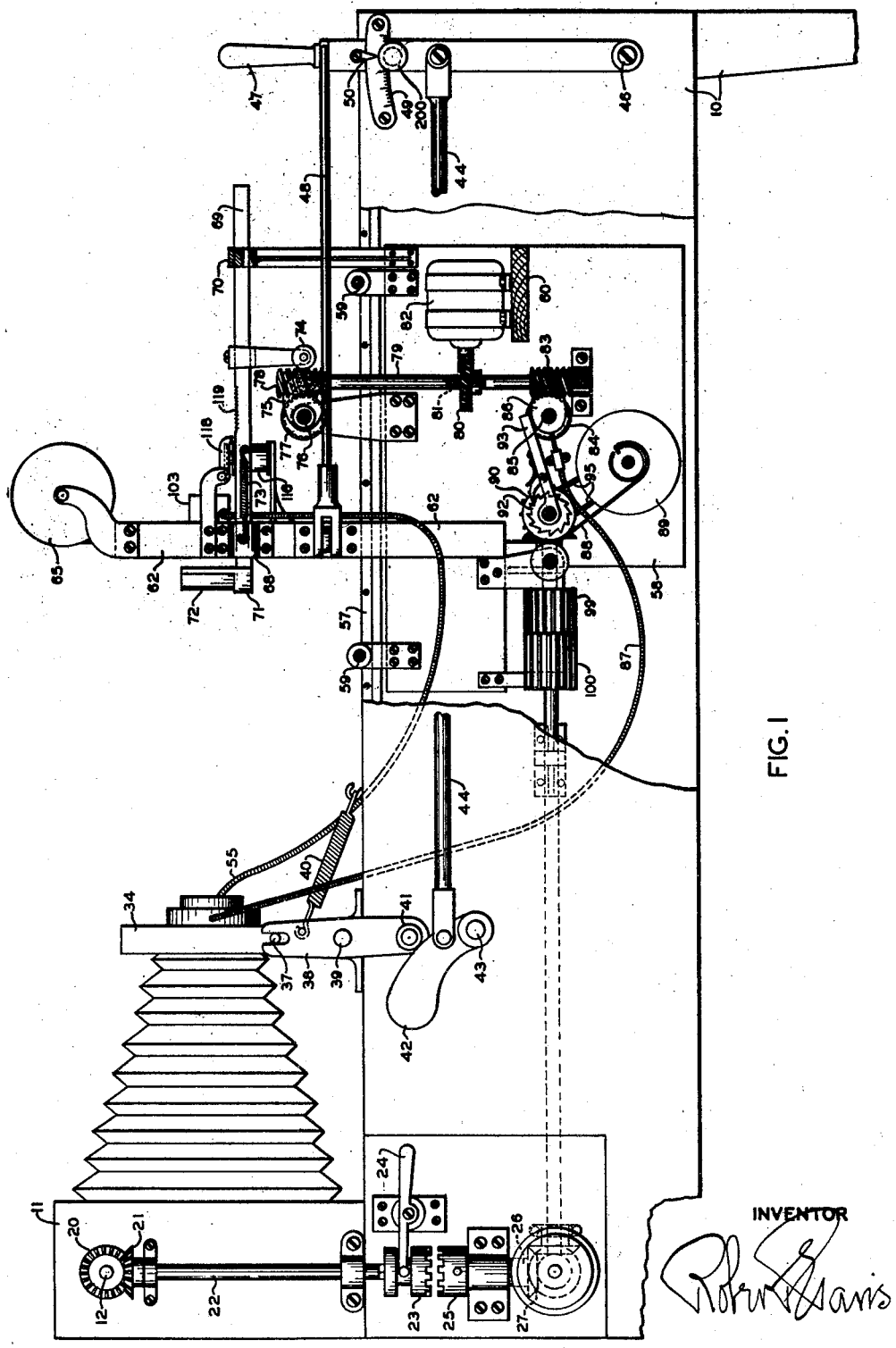
Fig. 1 is a side elevation of a preferred form of embodiment of my invention, parts being broken away for clearness.

Referring to the drawings in detail, 10 represents the main framework of the machine, which may be of any suitable design to support the several working parts.

Figure 3:
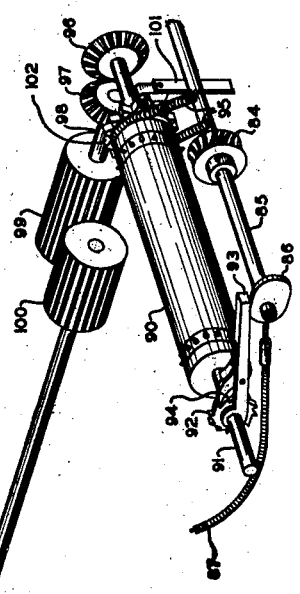
Fig. 3 is a perspective, detail view showing the feeding mechanisms for the copy and the photographic film.

The body of the camera is indicated at 11 and supports a feed shaft 12 rotatable in suitable bearings. The photographic film, paper, or the like, is fed from a roll 13, Fig. 3, over an idler roller 14, upwardly behind a mask 15 formed with a slot 16, over a toothed feed roll 17 fixed to shaft 12, and onto a take-up or receiving roller 18 driven by the usual spring belt 19 from shaft 12. Fixed on the outer end of shaft 12 is a beveled gear 20 meshing with and driven by a beveled gear 21 fixed to the upper end of a vertical shaft 22. Shaft 22, Fig. 1, is supported in bearings in brackets secured to the outside of the camera body 11, and carries at its lower end a clutch member 23 which is slidable along shaft 22, but secured against rotation independently thereof. A manually operable lever 24 is provided for raising and lowering clutch member 23 relative to a clutch member 25 fast to the upper end of a stub shaft 26 which carries at its other end a beveled gear 27. Gear 27 meshes a gear 28 fixed on a cross-shaft 29. Shaft 29 carries a hand wheel 30 at one end, and a beveled gear 31 at the other, and is rotatably supported in suitable bearings carried by the main framework. Gear 31 meshes with a similar gear 32 fixed on one end of a shaft 33, and driven by means which will be presently set forth. The train of elements from shaft 33 to roller 18 constitutes the film or photographic plate advancing means, clutch 23—25 being provided for use in loading the camera and/or the copy-holder, about to be described.

Figure 2:
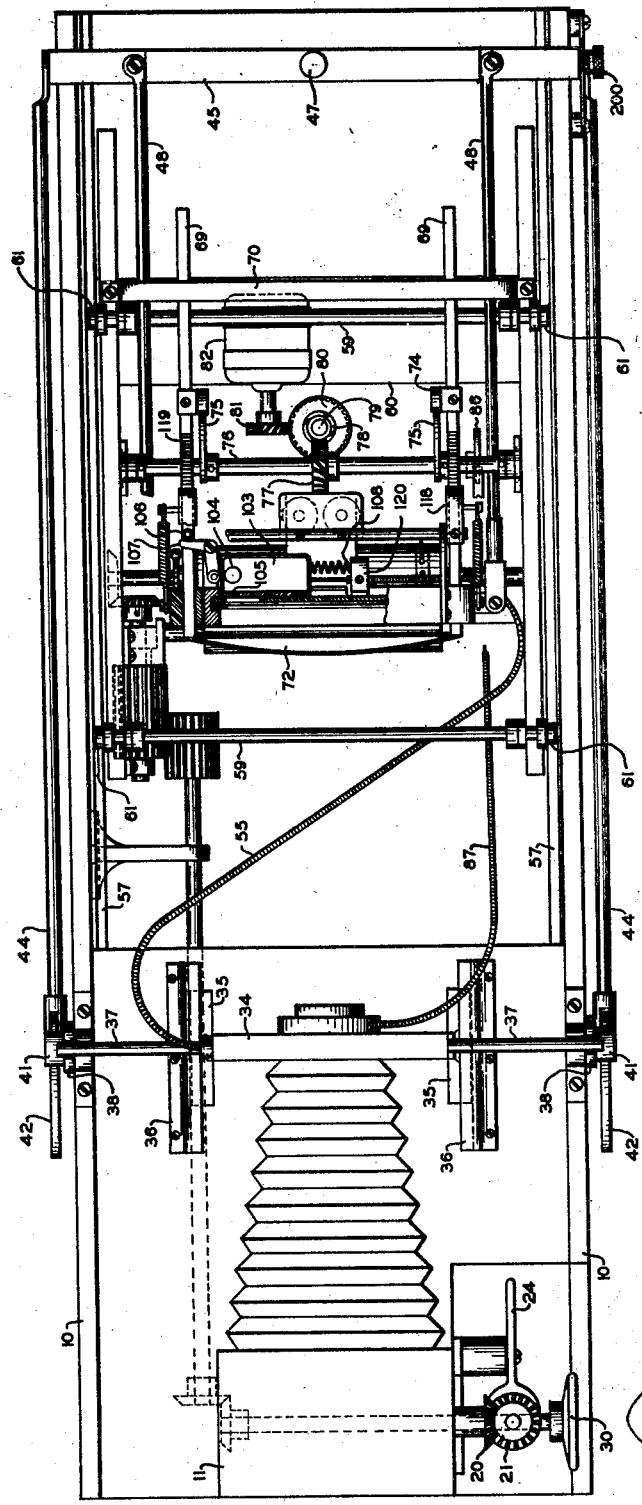
Fig. 2 is a top plan view of the same with parts removed.

As shown in Figs. 1, 2, and 4, the lens-board of the camera is shown at 34, and is provided with flanges 35 slidable in ways formed by cleats 36 supported by the main framework. Projecting from opposite sides of the lens-board 34 are pins 37 which extend into bifurcated ends of rock-levers 38 pivoted at 39 to brackets secured at opposite sides of the main framework. Tension springs 40 tend constantly to rock levers 38 so as to bring antifriction rollers 41 against the peripheries of respective identical cam members 42. Cams 42 are pivoted at 43 to the main framework, and may be moved by respective rods 44 which are pivotally connected to cams 42 at one end, and pivoted to a frame bar 45 at the other. The bar 45 is bent into U-shape, the legs being pivoted to the main frame at 46, Fig. 1, and the cross bar having a handle 47, Fig. 2. Secured to the frame 45 are links 48 which are connected to the copy-holder (to be described), so that by manipulation of handle 47, the copy-holder and lens-board may be moved relatively to determine the degree of enlargement, i. e., one-to-one or two-to-one, etc. A scale 49 and pointer 50, indicate the adjustment attained. (The lever 47 has, however, nothing to do with the line justification.)

Returning now to the lens-board 34, Fig. 4, it will be seen that it carries a slidable plate 51 which carries the lens 52 of the camera. The plate 51 is pressed in one direction by springs 53 against the nipple 54 of a Bowden wire 55. When the core 56 of this Bowden wire is extruded from the nipple 54, it slides plate 51 against the tension of springs 53, such springs later returning these parts when released. In this manner, the lens 52 is moved to compensate for the line justification (later described), so as to keep the left margin of all lines in proper vertical alignment on the photographic plate. The means for operating the core 56 will be presently set forth.

Referring now to Figs. 1 and 2, the main framework 10 is provided with rails 57 upon which is hung a sub-frame or carriage formed of side plates 58 secured together and spaced apart by tie rods 59, and a cross-plate or motor support 60. The tie rods 59 may carry wheels 61 which travel on rails 57. Mounted on this carriage are the copy-holder, line-justifying lens, and other parts, the carriage being movable by handle 47 and links 48. Any suitable means such as nut 200 may be employed for holding the carriage and lens-board in any adjusted position.

The copy-holder generally, consists of a frame 62 carrying a mask 63 having a slot 64 for displaying the copy one line at a time, the copy passing from a roll 65 between the mask 63 and a backer 66. The backer 66 has a short slot 67 for permitting light to pass through the copy sheet to the light-sensitive cell. The frame 62 carries brackets 68 through which pass two bars 69 which are guided in openings in a bracket 76, and which are secured together by a lens-carrier 71, in which is mounted a cylindrical lens 72. The lens 72 is, of course, merely a portion of a cylinder adjusted with the axis of the cylinder perpendicular and the lens being stationed between the copy-holder and the camera lens. It may now be seen that by moving the rods 69 toward the camera, lens 72 will be removed to an equal amount from the copy, and will correspondingly lengthen the image of the line of the copy. However, the image will not be a vertical magnification of the line of copy owing to the cylindrical form of lens 72. But the horizontal enlargement will be in both directions from the lens center, and to keep the left margin in alignment, the Bowden wire 55 is provided as hereinbefore stated.

Springs 73 tend constantly to urge bars 69 toward the camera, and thereby keep rollers 74 constantly against the peripheries of cams 75, the rollers 74 being carried by depending brackets fast to bars 69. Cams 75 are fixed on a shaft 76 having bearings in brackets rising from side plates 58 of the carriage. Fixed on shaft 76 is a worm gear 77, operable by a worm 78 fixed to a vertical shaft 79 supported in suitable bearings carried by the carriage. Fixed to shaft 79 is a spiral gear 80 which is driven by a spiral gear 81 fast to the shaft of a motor 82 fast on the board 60.

It may now be seen that when the motor 82 is operating, the train of gearing causes shaft 76 to rotate and cams 75 will cause the lens 72 to travel back and forth in the absence of any preventing means. This excursion-measuring means will be presently described.

Returning now to shaft 79 which we have seen is motor driven, there is a worm 83 secured to this shaft which drives a worm gear 84 on a cross shaft 85 having suitable bearings in the carriage frames 58. Fixed on shaft 85 is a cam 86, which serves two purposes. One of these purposes is to operate the camera shutter, and this it does by pressing one end of the core of the Bowden wire 87, the other end of which is connected to operate the shutter, as is well known in cameras. The second purpose of cam 86 is to feed the copy 88 from the delivery roll 65 through the copy-holder proper onto the receiving spool 89, and to operate the film feed shaft 33. For this purpose, the copy is fed by a toothed roller 90, Fig. 3, fixed to a shaft 91 having bearings in the carriage frames. This shaft 91 carries a ratchet wheel 92 fixed to it, and a lever 93 loosely pivoted on the shaft. Lever 93 carries a ratchet pawl 94, which is spring pressed against wheel 92, the free end of lever 93 resting on cam 86. Directly after cam 86 has worked the shutter by wire 87, it raises lever 93, thereby advancing roller 90 and the copy. The copy passes to storage roll 89 which is driven by the usual spring belt 95. Simultaneously, a beveled gear 96 fixed on shaft 91 drives a similar gear 97 fixed on a stub-shaft 98 carried by the carriage and carrying a pinion 99 which meshes with a pinion 100 fixed on shaft 33. In this manner the photographic film or plate is automatically advanced simultaneously with the copy. A spring pressed detent member 101 coacts with a star wheel 102 fixed on the end of roller 90 to assure the proper line-by-line feed, and prevent overthrow.

For the purpose of measuring the excursions of the lens 72 and the crosswise movement of the lens-carrying plate 51, I use a light-sensitive cell. This is shown as a photo-electric cell, although with necessary variation for the type of cell, as will be understood by those skilled in such matters, a selenium cell or other light-sensitive device could be used. Fastened to the backing plate 66 so as to be slidable horizontally there-across is a chamber 103, Figs. 2 and 6, containing a photo electric cell 104. The chamber 103 has a small slot 105 which admits light through the copy sheet 88 to the cell 104. Mounted on one of the bars 69 is a pin or roller 106, Fig. 2, which as the bars 69 move toward the camera cause the bell crank 107 to rotate and cause the chamber 103 to move toward the center of board 66, thereby causing slot 105 to traverse slot 67. The chamber 103 is pressed to normal position, Fig. 2, by a spring 108, and as the lens 72 is advanced, the chamber 103 is advanced, slot 105 traverses slot 67, and spring 108 is gradually compressed. The slot 67 is of such length as to embrace the possible endings of lines of the copy which it is desired to justify. Any lines shorter than the extent of slot 67 will be justified only to the extent of slot 67 (as, for instance, last lines of paragraphs).

Figure 7:
Fig. 7 is a view of a fragment of copy.

When written matter on the copy 88 obstructs the light passed through aperture 105, the photo-electric cell 104 will be deenergized. In the present high development of these cells, it is thought that even a "period" would cause this effect, but should such not prove the case, a line end could be indicated by a black block, such as shown in Fig. 7. In fact, all line ends could be so determined if desirable.

When sufficient light is permitted to play on the cell 104 to cause it to be energized, current flows to the amplifier 109, and thence to a magnet 110 holding armature 111 open. But when this light is cut down so that the cell 104 is ineffective, then the armature 111 is released to complete a circuit from battery 112 through armature 111 to lead 113, over switch 114 (which is closed when the machine is put into operation), over lead 115 to magnet 116 and back over lead 117 to the battery (or other source of power) 112. Magnet 116 controls operation of a pawl 118 which is normally held up by a suitable spring (not shown). Upon energizing magnet 116 the pawl 118 is drawn down into teeth 119 to stop the excursion of the bars 69 and lens 72. Thus the amount of enlargement necessary to effect line justification is determined, and lens 72 positioned accordingly.

The Bowden wire 55 has one end secured in a block 120, Fig. 2, with the core extended against the chamber 103. In this manner, movement of the chamber 103 effects sidewise movement of the camera lens to compensate for the justification, and keep the left margin of the image in proper vertical alignment.

If desired a black block may be printed at the end of every line, so as to insure proper operation of the light-sensitive cell and correct justification. Such blocks are indicated at 120 in Fig. 7.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

I claim:

1. In a line justifying device, the combination of a camera, a copy-holder, a lens adjustably supported with relation to the copy-holder, a line-end sensing device operatively related to said copy holder for sensing the end of a line of copy supported thereby, and a device responsive to said sensing device for adjusting said lens in accordance with the length of the line sensed.

2. In a line justifying device, the combination of a camera including a lens, a copy-holder, a lens adjustably supported, means for adjusting both of said lenses concomitantly, a line-end sensing device operatively associated with said copy holder for sensing the end of a line of copy supported thereby, and means responsive to said sensing device for limiting the extent of such adjustment.

3. In a line justifying device, the combination of a camera including a lens, a copy-holder, a lens adjustably supported between the camera and copy-holder, motor driven means for adjusting both of said lenses concomitantly, a line-end sensing device operatively associated with said copy holder for sensing the end of a line of copy supported thereby, and means responsive to said device for determining the extent of such adjustment.

4. In a line justifying device, the combination of a camera including a shutter, a copy-holder, a lens movably mounted between said camera and said copy-holder, a motor, means driven by said motor for moving said lens, a light sensitive cell for sensing the end of a line of copy supported by said copy holder, a device responsive to said cell for controlling movement of said lens, and means driven by said motor for operating said shutter in timed relation to the movement of said lens.

5. In a line justifying device, the combination of a camera including a shutter, a copy-holder, a lens movably mounted between said camera and said copy-holder, a motor, means driven by said motor for moving said lens, a light sensitive cell for sensing the end of a line of copy supported by said copy holder, a device responsive to said cell for controlling movement of said lens, means driven by said motor for operating said shutter in timed relation to the movement of said lens, and means driven by said motor for feeding copy and photographic plate in timed relation to the operation of said shutter.

6. In a line justifying device, the combination of a camera including a lens, a copy-holder, a lens adjustably supported, line-end sensing means for sensing the end of a line of copy to be photographed by said camera, a motor, and means driven by said motor under control of said line-end sensing means for moving both of said lenses in timed relation for the purpose set forth.

7. A line justifying machine including a camera, a copy holder, means operatively associated with said copy holder for sensing the end of a line, a lens movably supported between said camera and said copy holder, a motor, means driven by said motor for moving said lens, and an electromagnet responsive to said sensing device for effecting limitation of the movement of said lens by said motor driven means.

8. The combination of a camera having a shutter and a lens, a copy holder, a justifying lens adjustably supported, a copy feeding device, a plate feeding device, a motor, means driven by said motor for effecting relative movement between the camera lens and the copy holder for rectifying the left hand margin of the copy, means for operating said shutter and both feeding devices and said justifying lens in timed relation, means for sensing the end of a line of copy on said copy holder, and means controlled by said line-end sensing means for determining the amount of relative movement of said justifying lens.

ROBERT E. PARIS.